United States Patent
Allen-Ware et al.

(10) Patent No.: US 9,292,074 B2
(45) Date of Patent: *Mar. 22, 2016

(54) DISTRIBUTED POWER BUDGETING

(71) Applicant: International Business Machines Corporation, Armonk, NY (US)

(72) Inventors: Malcolm S. Allen-Ware, Austin, TX (US); Alan Drake, Austin, TX (US); Timothy G. Hallett, Oronoco, MN (US); Heather L. Hanson, Austin, TX (US); Jordan Keuseman, Rochester, MN (US); Charles R. Lefurgy, Austin, TX (US); Karthick Rajamani, Austin, TX (US); Todd J. Rosedahl, Zumbrota, MN (US); Guillermo J. Silva, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 312 days.

This patent is subject to a terminal disclaimer.

(21) Appl. No.: 13/762,532

(22) Filed: Feb. 8, 2013

(65) Prior Publication Data

US 2014/0149761 A1  May 29, 2014

Related U.S. Application Data

(63) Continuation of application No. 13/686,333, filed on Nov. 27, 2012.

(51) Int. Cl.
*G06F 1/32* (2006.01)
*G06F 9/50* (2006.01)

(52) U.S. Cl.
CPC ............ *G06F 1/3234* (2013.01); *G06F 1/3206* (2013.01); *G06F 1/3225* (2013.01); *G06F 9/5094* (2013.01); *Y02B 60/142* (2013.01)

(58) Field of Classification Search
CPC .... G06F 1/3243; G06F 1/3275; G06F 1/3234
See application file for complete search history.

(56) References Cited

U.S. PATENT DOCUMENTS 6,167,330 A  * 12/2000  Linderman ................... 700/295
7,155,623 B2 * 12/2006  Lefurgy et al. ............... 713/324

(Continued)

FOREIGN PATENT DOCUMENTS

TW            200629053           8/2006

OTHER PUBLICATIONS

"HP Power Capping and HP Dynamic Power Capping for Proliant servers", Hewlett-Packard Development Company, L.P. TechCom@HP.com Jan. 2011, 25 pages.

(Continued)

*Primary Examiner* — Jaweed A Abbaszadeh
*Assistant Examiner* — Gary Collins
(74) *Attorney, Agent, or Firm* — DeLizio Law, PLLC

(57) ABSTRACT

Embodiments include collecting, from each of a plurality of controllers of a node having a plurality of components, component power consumption. Each of the plurality of controllers is associated with one or more of the components. The component power consumptions are provided to the controllers. A node power consumption for the node is determined based, at least in part, on the component power consumption. The power cap is determined for the plurality of components. A power differential power is determined as a difference between the node power consumption and the power cap for the plurality of components. A proportion of the node power consumption consumed by the component is determined based on the component power consumption of the component. A local power budget is computed for the component based, at least in part, on the power differential and the proportion of the node power consumption consumed by the component.

6 Claims, 5 Drawing Sheets

(56) References Cited

U.S. PATENT DOCUMENTS

| | | | |
|---|---|---|---|
| 7,310,737 B2 | 12/2007 | Patel et al. | |
| 7,444,526 B2* | 10/2008 | Felter et al. | 713/300 |
| 7,539,881 B2* | 5/2009 | Shaw et al. | 713/300 |
| 7,861,102 B1* | 12/2010 | Ranganathan et al. | 713/300 |
| 8,006,108 B2* | 8/2011 | Brey et al. | 713/320 |
| 8,140,868 B2* | 3/2012 | Felter et al. | 713/300 |
| 8,151,122 B1* | 4/2012 | Ranganathan et al. | 713/300 |
| 8,375,228 B2* | 2/2013 | Kashyap | 713/300 |
| 8,429,433 B2* | 4/2013 | Carter et al. | 713/300 |
| 8,589,556 B2* | 11/2013 | Arndt et al. | 709/226 |
| 2002/0147932 A1* | 10/2002 | Brock et al. | 713/300 |
| 2003/0079150 A1* | 4/2003 | Smith et al. | 713/320 |
| 2003/0084359 A1* | 5/2003 | Bresniker et al. | 713/324 |
| 2004/0255171 A1* | 12/2004 | Zimmer et al. | 713/300 |
| 2005/0125703 A1* | 6/2005 | Lefurgy et al. | 713/320 |
| 2006/0005057 A1* | 1/2006 | Nalawadi et al. | 713/320 |
| 2006/0053324 A1* | 3/2006 | Giat et al. | 713/300 |
| 2006/0123368 A1* | 6/2006 | Pineda De Gyvez et al. | 716/6 |
| 2006/0218423 A1* | 9/2006 | Diefenbaugh et al. | 713/310 |
| 2006/0282685 A1* | 12/2006 | Bahali et al. | 713/300 |
| 2006/0288241 A1* | 12/2006 | Felter et al. | 713/300 |
| 2007/0067657 A1* | 3/2007 | Ranganathan et al. | 713/300 |
| 2007/0198863 A1* | 8/2007 | Bose et al. | 713/300 |
| 2008/0222435 A1* | 9/2008 | Bolan et al. | 713/310 |
| 2009/0144566 A1* | 6/2009 | Bletsch et al. | 713/300 |
| 2009/0171511 A1* | 7/2009 | Tolentino | 700/297 |
| 2010/0205469 A1* | 8/2010 | McCarthy et al. | 713/324 |
| 2010/0205471 A1* | 8/2010 | Vavilala et al. | 713/340 |
| 2011/0004500 A1* | 1/2011 | Nathuji | 705/7 |
| 2011/0055597 A1* | 3/2011 | Wyatt | 713/300 |
| 2012/0124403 A1* | 5/2012 | Goodrum et al. | 713/320 |
| 2012/0185706 A1* | 7/2012 | Sistla et al. | 713/300 |
| 2013/0054985 A1* | 2/2013 | Allen-Ware et al. | 713/300 |
| 2013/0318371 A1* | 11/2013 | Hormuth | 713/320 |
| 2014/0046816 A1* | 2/2014 | Avari et al. | 705/35 |
| 2014/0149760 A1 | 5/2014 | Drake et al. | |

OTHER PUBLICATIONS

Almoosa, N et al., "A Power Capping Controller for Multicore Processors", CERCS Tech Report GIT-CERCS-11-07 { nawaf, wjhsong}@gatech.edu, {ywardi, sudha}@ece.gatech.edu 2007, pp. 1-6.

Broyles, Martha et al., "IBM EnergyScale for POWER7 Processor-Based Systems", Nov. 2007, 1-66 pages.

Felter, Wes et al., "A Performance-Conserving Approach for Reducing Peak Power Consumption in Server Systems", ICS'05, Jun. 20-22 {wmf,karthick, tkeller}@us.ibm.com; rusu@cs.pitt.edu 2005, pp. 1-10.

Hanson, Heather et al., "Processor-Memory Power Shifting for Multi-Core Systems", International Business Machines Jun. 9, 2012, pp. 1-7.

Ma, Kai et al., "PGCapping: Exploiting Power Gating for Power Capping and Core Lifetime Balancing in CMPs", PACT'12, Sep. 19-23, 2012 {mak, xwang}@ece.osu.edu 2012, pp. 1-10.

"U.S. Appl. No. 13/686,333 Office Action", Apr. 9, 2015, 16 Pages.

\* cited by examiner

DISTRIBUTED POWER BUDGETING

RELATED APPLICATIONS

This application claims the priority benefit of U.S. application Ser. No. 13/686,333 filed Nov. 27, 2012.

BACKGROUND

Embodiments of the inventive subject matter generally relate to the field of computer system power management and more particularly, to distributed power management informed with global power consumption information.

Various techniques have been used in an attempt to reduce power consumption while maintaining system performance. For example, some systems use dynamic voltage and frequency scaling (DVFS). DVFS modifies the voltage supplied to the system and the frequency at which the processor operates. DVFS may allow a system to operate in low-power states, and only have increased power consumption when necessary. For example, during a high workload period, the voltage supplied to the system and the frequency at which the processor operates may be high. During a low workload period, DVFS may decrease the voltage supplied to the system and decrease the frequency at which the processor operates. In addition to DVFS, some systems utilize power capping mechanisms. Such mechanisms impose an upper limit, or cap, on the power consumption of the system.

SUMMARY

Embodiments of the inventive subject matter include collecting, from each of a plurality of controllers of a node having a plurality of components, component power consumption. Each of the plurality of controllers is associated with a respective one of the plurality of components. The component power consumptions are provided to each of the plurality of controllers. A node power consumption for the node is determined based, at least in part, on the component power consumption. The power cap is determined for the plurality of components. A power differential power is determined as a difference between the node power consumption and the power cap for the plurality of components. A proportion of the node power consumption consumed by the component is determined based on the component power consumption of the component. A local power budget is computed for the component based, at least in part, on the power differential and the proportion of the node power consumption consumed by the component.

Embodiments of the inventive subject matter include an apparatus comprising a plurality of processing components. A distributor to provide to each of the plurality of controllers, an indication of power consumption for the apparatus based, at least in part, on component power consumptions of the plurality of processing components. A plurality of controllers, each of which is associated with a respective one of the plurality of processing components. A power differential is determined by the plurality of controllers as a difference between a power cap for the apparatus and a power consumption sum based, at least in part, on the component power consumptions. A power consumption sum attributable to the respective one of the plurality of processing components associated with the controller is determined by the respective one of the plurality of controllers. A local power budget for the respective one of the plurality of processing components associated with the controller is computed based, at least in part, on the power differential and the proportion of the power consumption sum attributable to the respective one of the plurality of processing components associated with the controller.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
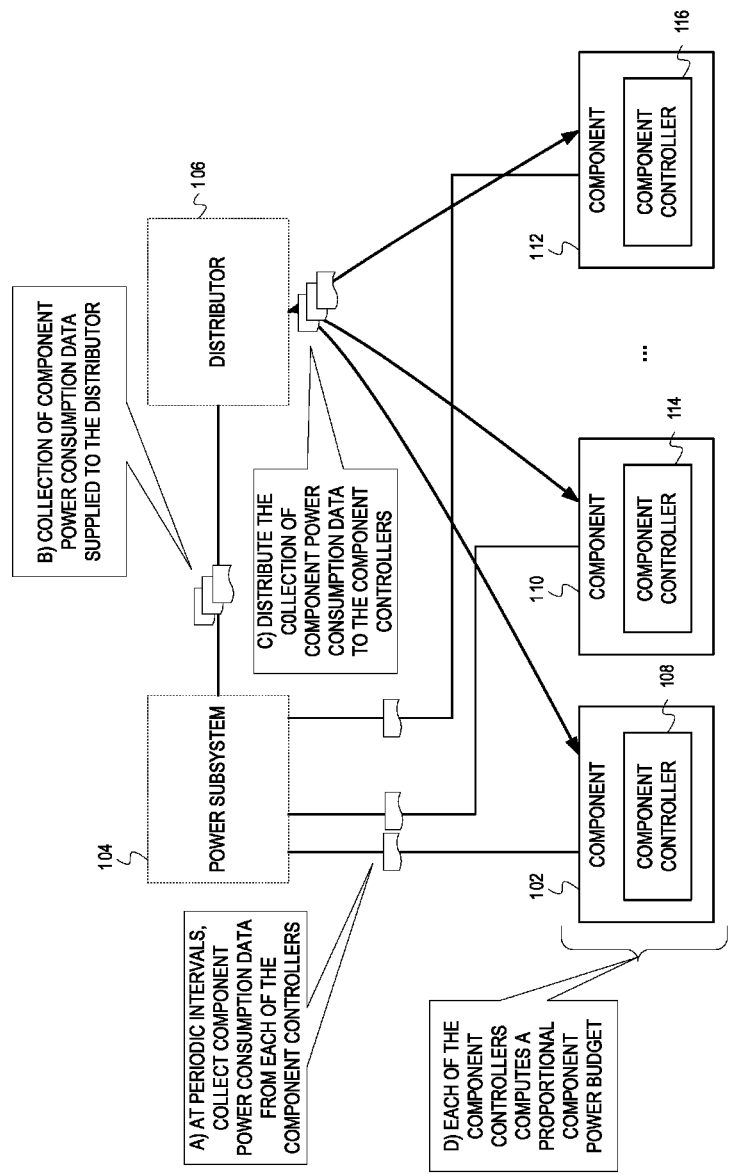
FIG. 1 depicts a conceptual diagram of an example node with distributed local power budgeting based on node level visibility of power consumption.

The description that follows includes exemplary systems, methods, techniques, instruction sequences and computer program products that embody techniques of the present inventive subject matter. However, it is understood that the described embodiments may be practiced without these specific details. For instance, although examples suggest a 1:1 relationship between component controllers and components, a component controller can be associated with multiple components. In other instances, well-known instruction instances, protocols, structures and techniques have not been shown in detail in order not to obfuscate the description.

Often times, power management mechanisms are centralized—that is, a central controller or microprocessor manages the power supplied to each component of the system. Centralized power management can be effective in controlling power consumption of the system, but can also be costly from a performance standpoint. Because the central controller or microprocessor manages power allocation for each component, the central controller or microprocessor is heavily occupied with managing power consumption for the multiple components of the system. In systems where power allocation is modified frequently, power management spends resources computing the power allocations for the components and incurs communication overhead for communicating the power allocations throughout the system Distributing control and management of power budgets for components allows for scalability in a complex system with a multitude of components, as well as reducing processing overhead. Information about power consumption by the multitude of components in a system is collected, and then distributed to controllers for each of the components. This distribution of system wide power consumption information provides a controller of a component a node level view of power consumption. For this description, a node includes a group of components. Examples of a node include a server, a rack server, a board with multiple microprocessors, a blade server, a multi-core processor, etc. Examples of components include a processor, a memory module, an input/output hub controller, a processor core, core memory, etc. With the power consumption information, the controller for the component ("component controller") can compute a power budget for the component based on a proportion of the node power consumption attributable to the component. This component level proportional power budgeting allows for consistent performance. Components using a greater amount of power will be given greater component power budgets and components consuming smaller amounts of power (e.g., idle components) will be given smaller component power budgets. The greater power budgets allow working components to consume greater amounts of power when available and to reduce the impact of reductions when node power consumption exceeds the node power cap. Distributing the task of determining the component power budgets avoids a single point of failure in power management. Tasking a processor with distributing the power consumption information instead of computing several power budgets frees resources (e.g., cycles) for other tasks. Or a less resource intensive component can be tasked with distributing the power consumption information.

FIG. 1 depicts a conceptual diagram of an example node with distributed local power budgeting based on node level visibility of power consumption. The node of FIG. 1 comprises a power subsystem 104, multiple components, and a distributor 106. FIG. 1 only depicts three components 102, 110, and 112 to avoid adding unnecessary complexity to the figure. Each of the components 102, 110, and 112 has respective component controllers 108, 114, and 116. The component controllers can be implemented with any one of a proportional controller, a proportional-integral controller, and a proportional-integral-derivative controller. FIG. 1 depicts example operations at stages A-D. The stages are examples and are not necessarily discrete occurrences over time (e.g., operations of different stages may overlap).

At a stage A, the power subsystem 104 collects component power consumption data from each of the component controllers 108, 114, and 116 at periodic intervals. For instance, the power subsystem 104 collects power consumption data from all of the components controllers 108, 114, 116 within a time period x. The power consumption data indicates power consumption that can be attributed to a single component. But the power may be consumed by the component and sub-components and/or other coupled components. For instance, power consumption data may indicate an amount of power consumption attributable to a processor component. But the power is actually consumed by the processor component, off-chip cache of the processor component, and random access memory used by the processor component. Collection of the power consumption data can be in accordance with a push method, pull method, or a combination of both. The component 102, 110, and 112 can be configured to automatically transmit component power consumption data to the power subsystem 104 at periodic intervals. The power subsystem 104 can actively request component power consumption data from the component(s) 102, 110, and 112 at periodic intervals. The power subsystem 104 also collects background power consumption data (e.g., fan power consumption). In addition to collecting power consumption data, the power subsystem 104 filters the power consumption data to remove electrical noise that may occur in the power consumption data.

At stage B, the power subsystem 104 supplies the distributor 106 with the collected power consumption data. Again, a pull method, push method, or combination of push and pull may be used to convey the collected power consumption data from the power subsystem 104 to the distributor 106. For instance, the distributor 106 may poll the power subsystem 104 for the collected power consumption data at the expiration of each periodic interval. As another example, the power subsystem 104 may send a message (e.g., interrupt) to the distributor 106 in response to collecting the power consumption data from the components and the background power consumption data. At stage C, the distributor 106 distributes the collection of component power consumption data to the component controllers 108, 114, and 116. If the upper power consumption threshold for the node ("node power cap") is not already known or readily accessible by each controller (e.g., the node power cap is set at boot-up in memory available to the controllers), the distributor 106 also communicates the node power cap to each of the component controllers 108, 114, and 116.

At stage D, each of the component controllers 108, 114, and 116 compute a proportional component power budget for their associated components 102, 110, and 112. The below tables illustrate proportional component power budgets based on node power consumption.

TABLE 1

| Core No. | Component | $T_0$ (W) | Workload |
|---|---|---|---|
| $Core_0$ | Processor | 170 | Processor 0 Working |
| | Memory | 90 | DIMMs for Processor 0 Working |
| $Core_1$ | Processor | 110 | Processor 1 Idling |
| | Memory | 50 | DIMMs for Processor 1 Idling |
| $Core_2$ | Processor | 110 | Processor 2 Idling |
| | Memory | 50 | DIMMs for Processor 2 Idling |
| $Core_3$ | Processor | 110 | Processor 3 Idling |
| | Memory | 50 | DIMMs for Processor 3 Idling |
| Background | N/A | 100 | Background Power |
| Total Power | | 840 | |

Table 1 indicates component power consumptions for a node. The node has four cores and eight components (two components per core—a processor component and a memory component). The power consumption of each component (in Watts) during the time period 0 is indicated in the "T0" column. During time period 0, Core0 consumed a total of 260 W (processor component: 170 W, memory component 90 W). As indicated by the "Workload" column, Core0 was working and not in an idle state during time period 0. Cores1-3, however, were in an idle state during time period 0, and consumed less power than Core0 (160 W per core—each processor component of Cores1-3: 110 W, each memory component of Cores1-3 50 W). Table 1 also includes the background power consumed during time period 0. The node power consumption was 840 W during time period 0 (including background power consumption of 100 W).

Assuming the node has a node power cap of 1000 W, the node underutilized the total power capacity by 160 W during time period 0. After receiving the power consumption data (depicted in Table 1), each of the component controllers of the node calculates a component power budget for time period 1. Table 2 shows a computation of proportional component power budgets on a pro-rata basis.

TABLE 2

| Core No. | Component | $T_0$ (W) | Frac. | Frac.*Avail. (W) | $T_1$ (W) |
|---|---|---|---|---|---|
| $Core_0$ | Processor | 170 | 20.2% | 32.4 | 202.4 |
| | Memory | 90 | 10.7% | 17.1 | 107.1 |
| $Core_1$ | Processor | 110 | 13.1% | 21.0 | 131.0 |
| | Memory | 50 | 6.0% | 9.5 | 59.5 |

TABLE 2-continued

| Core No. | Component | $T_0$ (W) | Frac. | Frac.*Avail. (W) | $T_1$ (W) |
|---|---|---|---|---|---|
| $Core_2$ | Processor | 110 | 13.1% | 21.0 | 131.0 |
|  | Memory | 50 | 6.0% | 9.5 | 59.5 |
| $Core_3$ | Processor | 110 | 13.1% | 21.0 | 131.0 |
|  | Memory | 50 | 6.0% | 9.5 | 59.5 |
| Background | N/A | 100 | 11.9% | 19.0 | 119.0 |
|  | Total | 840 |  |  | 1000 |

As discussed previously, the excess power to be allocated for time period 1 is 160 W. During time period 0, Core0's processor component consumed 170 W. This represents roughly 20% of the node power consumed during time period 0. Therefore, Core0's processor component will be budgeted roughly 20% of the 160 W of excess power during time period 1, or roughly 32 W of the excess power. Core0's processor component will be budgeted roughly 202 W for time period 1.

The above example illustrates the efficiency of locally computing power budget computations relative to a centralized approach. Instead of one of the cores or another processing being burdened with computing the power budgets for 4 cores (i.e., 8 components), each component controller computes a power budget for only two components. Consequently, each component controller makes only five power budgeting calculations per time period:

Determine the reciprocal of the node power consumption ("1/Node")

Determine the processor component's fractional power consumption for time period 0 ("Frac.p") by multiplying the processor component's power consumption for time period 0 by 1/Node Determine the processor component's proportion of the excess power for time period 1 by multiplying the excess power available for time period 0 by Frac.p Determine the memory component's fractional power consumption for time period 0 ("Frac.m") by multiplying the memory component's power consumption for time period 0 by 1/Node Determine the memory component's proportion of the excess power for time period 1 by multiplying the excess power available for time period 0 by Frac.m These five calculations are estimated to consume less than 100 cycles. Assuming 2 ns per cycle, the time consumed by a process requiring 100 cycles is 200 ns. If, for example, each time period is 250 µs, at less than 100 cycles, the processing time for each component controller to calculate power budgets is less than one percent of the 250 µs time period (<200 ns/250 µs or <0.8%). This results in a processing consumption of less than 1% in terms of the component controllers instructions per second.

In some cases, a node may consume more power than the given total power capacity defined or set for the node. Embodiments can use the distributed computation of proportional component power budgets to throttle power consumption in a proportional manner across the components. An example of this is depicted in Tables 3 and 4.

TABLE 3

| Core No. | Component | $T_2$ (W) | Workload |
|---|---|---|---|
| Core 0 | Processor | 220 | Processor 0 Working |
|  | Memory | 120 | DIMMs for Processor 0 Working |
| Core 1 | Processor | 220 | Processor 1 Working |
|  | Memory | 120 | DIMMs for Processor 1 Working |

TABLE 3-continued

| Core No. | Component | $T_2$ (W) | Workload |
|---|---|---|---|
| Core 2 | Processor | 110 | Processor 2 Idling |
|  | Memory | 50 | DIMMs for Processor 2 Idling |
| Core 3 | Processor | 110 | Processor 3 Idling |
|  | Memory | 50 | DIMMs for Processor 3 Idling |
| Background | N/A | 100 | Background Power |
| Total Power |  | 1100 |  |

Table 3 indicates component power consumption for a node during a time period 2. Again, the node has four cores and eight components (two components per core—a processor component and a memory component). Unlike Table 1, Table 3 indicates that both Core0 and Core1¬ are working and not in an idle state during time period 2. During time period 2, Core0 and Core1 each consume a total of 340 W (each processor component: 220 W, each memory component: 120 W). As in Table 1, both Core2 and Core3 were in an idle state during time period 2, and consumed less power than Core0 and Core1 (160 W per core—each processor component of Cores2-3: 110 W, each memory component of Cores2-3: 50 W). The node power consumption was 1100 W during time period 2 (including background power consumption of 100 W).

Again, assuming the node has a defined node power cap of 1000 W, the node exceeded the node power cap by 100 W during time period 2. After receiving the power consumption data (depicted in Table 3), individual component controllers of the node calculate component power budgets for time period 3. Table 4 shows a computation of proportional component power budgets on a pro-rata basis. It should be noted that background power is not reduced. Consequently, to bring the node power consumption within the 1000 W node power cap, the node power consumption, excluding background power consumption, must be brought below 900 W. In other words, the component power budget of each component for time period 3 will be reduced by a portion of the 100 W of excess power used based on their power consumption during time period 2.

TABLE 4

| Core No. | Component | $T_2$ (W) | Frac. | Frac.*Excess. (W) | $T_3$ (W) |
|---|---|---|---|---|---|
| Core 0 | Processor | 220 | 20.0% | 20.0 | 200.0 |
|  | Memory | 120 | 10.9% | 10.9 | 109.1 |
| Core 1 | Processor | 220 | 20.0% | 20.0 | 200.0 |
|  | Memory | 120 | 10.9% | 10.9 | 109.1 |
| Core 2 | Processor | 110 | 10.0% | 10.0 | 100.0 |
|  | Memory | 50 | 4.5% | 4.5 | 45.5 |
| Core 3 | Processor | 110 | 10.0% | 10.0 | 100.0 |
|  | Memory | 50 | 4.5% | 4.5 | 45.5 |
| Background | N/A | 100 | N/A | N/A | 100.0 |
|  | Total | 1100 |  |  | 1000.1 |

As previously discussed, the excess power consumed by the node during time period 2 was 100 W. Consequently, node power consumption for time period 3 will be reduced by 100 W. During time period 2, Core0's processor component consumed 220 W. This represents roughly 20% of the node power consumed during time period 2. Core0's processor component's power budget for time period 3 will be reduced by roughly 20% of the 100 W of excess power consumed during time period 2, or roughly 20 W. Core0's processor component will be budgeted roughly 200 W for time period 3.

The power budgeting discussed can conserve resources in several scenarios. In a first scenario, a component is consuming relatively little power and the node power consumption is below the node power cap. Because the node power is below the node power cap, it is not necessary for a control system to be engaged. Thus, the component is able to run at its maximum performance.

In a second scenario, a component is consuming relatively greater power and the node power consumption is below the node power cap. Because the node power consumption is below the node power cap, it is not necessary for a control system to be engaged. Thus, the component is able to run at its maximum performance.

In a third scenario, a component is consuming relatively little power and the node power consumption is above the node power cap. Because the node power consumption is above the node power cap, a control system will be engaged and the node power consumption will be reduced. In this scenario, the component controller associated with the component consuming relatively little power can decrease the power budget for the component over subsequent time periods, aiding in bringing the node power consumption below the node power cap. Additionally, if the component consuming relatively little power experiences a sudden increase in workload, the node power cap may not be breached based on the budget given to that component during lower workload periods. This can prevent the node power consumption from breaching the node power cap when components experience a sudden increase in workload.

Figure 2:
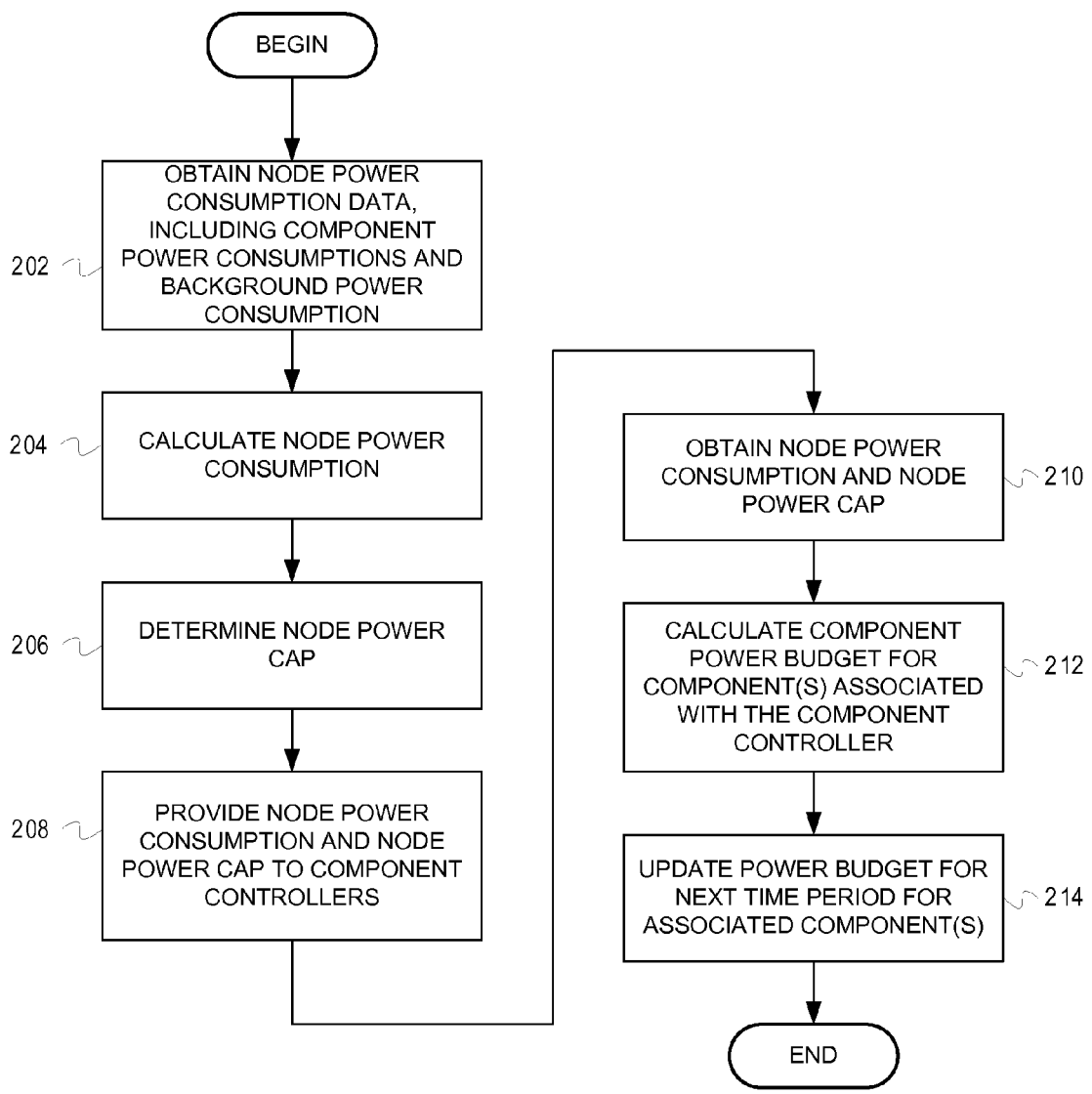
FIG. 2 is a flow diagram of example operations for local updating of component power budgeting based on visibility of node power consumption in a given time period.

In a fourth scenario, a component is consuming relatively greater power and the node power consumption is above the node power cap. Because the node power consumption is above the node power cap, a control system will be engaged and the node power consumption will be reduced. In this scenario, the component controller associated with the component consuming relatively greater power can decrease the power budget to the component over subsequent time periods, aiding in bringing the node power consumption below the node power cap. Because the power budgeting is proportional, the component consuming relatively great power will still be budgeted a large portion of the power, relative to the other components. Once below the node power cap, the power budget of the component consuming relatively great power can be increased to increase performance. If the node power cap is once again breached, the process can repeat itself FIG. 2 is a flow diagram of example operations for local updating of component power budgeting based on visibility of node power consumption in a given time period. The flow begins at block 202.

At block 202, the distributor obtains node power consumption data, including component power consumptions and background power consumption, from a power subsystem. A variety of implementations are possible for the distributor to obtain the node power consumption data. For instance, the power subsystem may signal the distributor when all of the node power consumption data for a given time period is available to be read by the distributor. Alternatively, the power subsystem can write the node power consumption data in a batch or incrementally (e.g., write the data as it is received from each component controller) to a memory location accessible by the distributor or a memory location that is part of the distributor. The flow continues at block 204.

At block 204, the distributor calculates the node power consumption. The distributor computes a sum of the component power consumptions and the background power consumption. The flow continues at block 206.

At block 206, the distributor determines the node power cap defined for the node. The node power cap may be set in many ways. For example, the node power cap may be set based on the node's physical constraints. The node power cap may be set in accordance with a policy or firmware. The flow continues at block 208.

At block 208, the distributor provides the node power consumption and the node power cap to each of the component controllers. The distributor can broadcast the node power consumption and the node power capacity to each of the component controllers. For instance, the distributor sends messages or packets carrying the node power consumption and the node power cap to the component controllers. As another example, the distributor writes the node power consumption and node power cap into registers of each of the component controllers. The flow continues at block 210.

The operations from block 210 and subsequent to block 210 represent operations of one of the component controllers. At block 210, the component controller obtains the node power consumption and the node power cap from the distributor. As stated with respect to block 208, the component controller may receive the node power consumption and the node power cap over a bus, read the node power consumption and the node power cap from a local register, etc. The flow continues at block 212.

At block 212, the component controller calculates the component power budget for a component(s) associated with the component controller for a next time period. This calculation is performed based on the node power consumption for the given time period and the proportion of the node power consumption used by the component(s) during the given time period. The flow continues at block 214.

At block 214, the calculated component power budget is used for the associated component for the next time period. For instance, the controller activates an actuator to modify operation of a component in accordance with the calculated component power budget for the succeeding time period. The controller itself may actuate the change in power consumption, or the controller may pass an indication of the calculated component power budget to another device that modifies operation of the associated component accordingly.

Figure 3:
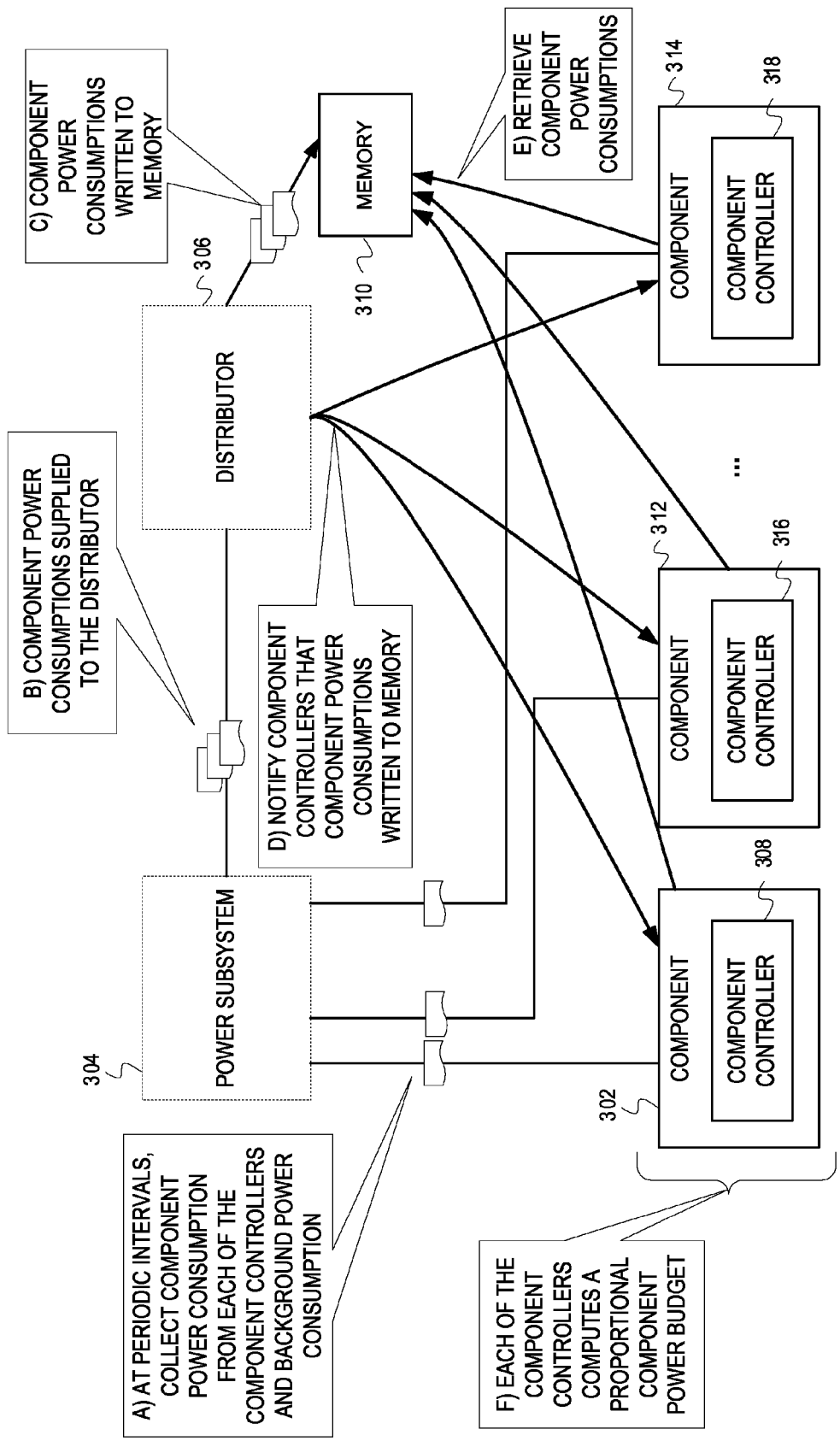
FIG. 3 depicts a conceptual diagram of an example node with distributed local power budgeting based on node level visibility of power consumption communicated with a notification technique.

FIG. 3 depicts a conceptual diagram of an example node with distributed local power budgeting based on node level visibility of power consumption communicated with a notification technique. The node of FIG. 3 comprises a power subsystem 304, multiple components 302, 312, and 314, a distributor 306, and memory 310. The memory 310 may be shared across the components 302, 312, 314. The memory 310 may be distinct memories accessible by individual ones of the components and the distributor 306. FIG. 3 only depicts three components 302, 312, and 314 to avoid adding unnecessary complexity to the figure. Each of the components has respective component controllers 308, 316, and 318. FIG. 3 depicts example operations depicted as occurring over stages A-F. The stages are examples and are not necessarily discrete occurrences over time (e.g., operation of different stages may overlap).

At stage A, the power subsystem 304 collects component power consumption data from each of the component controllers 308, 316, and 318 and background power consumption at periodic intervals. The background power consumption is not necessarily collected from the component controllers 308, 316, and 318. The power consumption data indicates power consumption that can be attributed to a single component. But the power may be consumed by the component and sub-components and/or other coupled components. For instance, power consumption data may indicate an amount of power consumption attributable to a processor. But the power is actually consumed by the processor, off-chip cache of the processor, and random access memory used by the processor. Collection of power consumption data can be a push method, pull method, or a combination of both. The components 302, 312, and 314 can be configured to automatically transmit component power consumption data to the power subsystem 304 at periodic intervals. The power subsystem 304 can actively request component power consumption data from the components 302, 312, and 314 at periodic intervals. The power subsystem, 304 also collects background power consumption data (e.g., fan power consumption). In addition to collecting power consumption data, the power subsystem 304 filters power consumption data to remove electrical noise.

At stage B, the power subsystem 304 supplies the distributor 306 with the collected power consumption data. Again, a pull method, a push method, or a combination of push and pull may be used to convey the collected power consumption data from the power subsystem 304 to the distributor 306. For instance, the distributor 306 may poll the power subsystem 304 for the collected power consumption data at the expiration of each periodic interval. As another example, the power subsystem 304 may send a message (e.g. interrupt) to the distributor 306 in response to collecting the power consumption data, including the background power consumption data.

At stage C, the distributor 306 writes the collection of power consumption data to memory 310. For example, the distributor 306 writes the collection of power consumption data to a reserved section of the memory 310. Or the distributor 306 writes the collection of power consumption to available free space in the memory 310.

At stage D, the distributor 306 notifies the component controllers 302, 312 and 314 that the collection of power consumption data has been written to the memory 310. The notification indicates the address or addresses of the memory 310 in which the data has been written. If the power cap for the node is not already known by each controller (e.g., the power cap is set at boot-up in memory accessible by the controllers, is defined in a register by firmware, etc.), the distributor 306 also writes the node power cap to the memory 310 and notifies the component controllers 302, 312, and 314 of the location in memory in which the node power cap has been written.

At stage E, the component controllers 308, 316, and 318 access memory 310 and retrieve the collection of power consumption data and the node power cap. For example, the component controllers 308, 316, and 318 access the memory 310 with the address provided by the distributor 306. As another example, the component controllers 308, 316, and 318 access the memory 310 with an address for a reserved section of the memory 310 that is stored in a local register.

At stage F, each of the component controllers 308, 316, and 318 compute a proportional component power budget for their associated components 302, 312, and 314. As discussed previously (see discussion of FIG. 1 and Tables 1-4), the component power budgets are based on node power consumption awareness at a component level.

Figure 4:
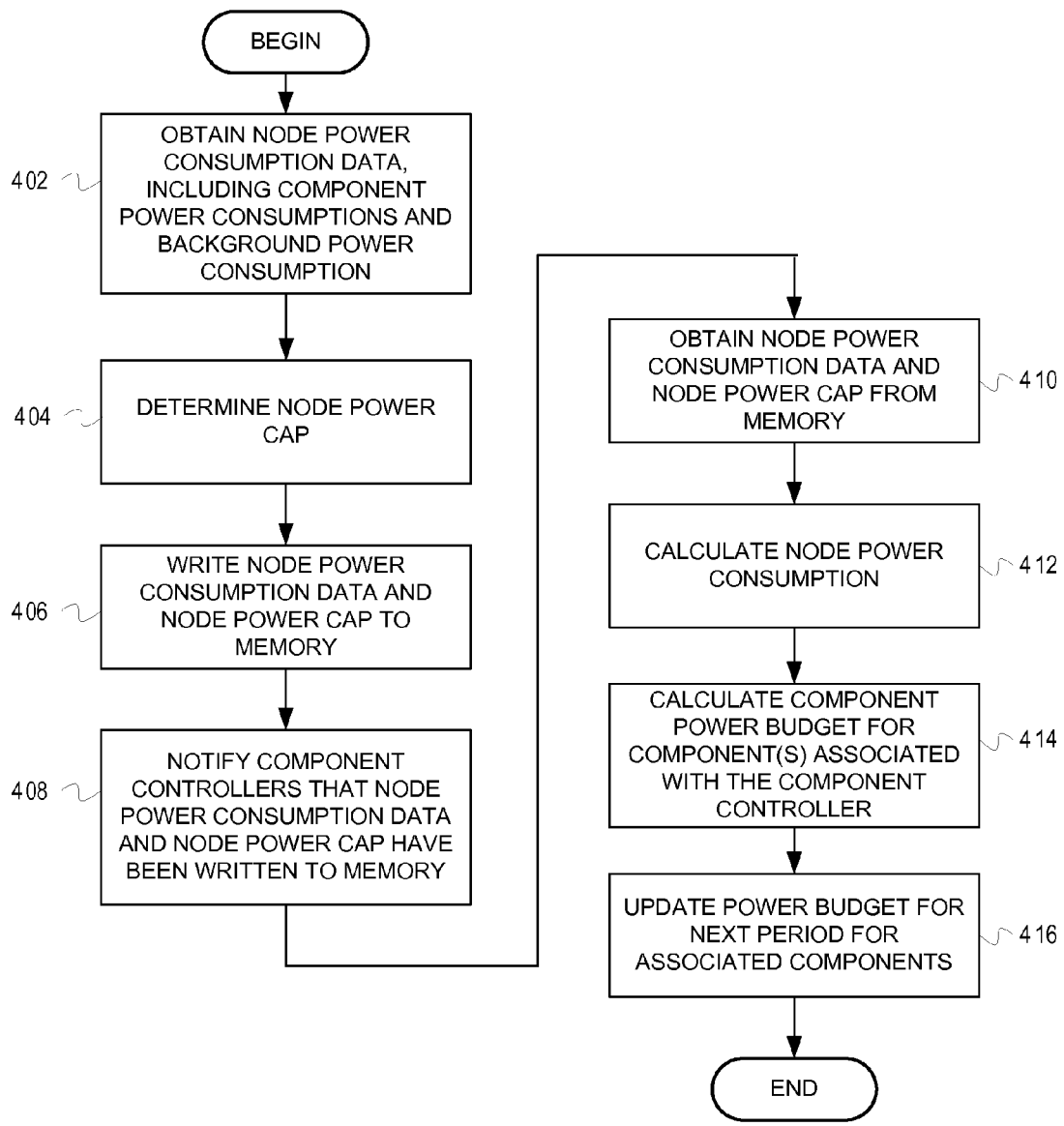
FIG. 4 is a flow diagram of example operations for local updating of component power budgets based on visibility of node power consumption in a given time interval with a notification technique.

FIG. 4 is a flow diagram of example operations for local updating of component power budgets based on visibility of node power consumption in a given time interval with a notification technique. The flow begins at block 402.

At block 402, the distributor obtains node power consumption data, including component power consumption and background power consumption from a power subsystem for the given time period. A variety of implementations are possible for the distributor to obtain the node power consumption data. For instance, the power subsystem may signal the distributor when all of the node power consumption data for a given time period is available to be read by the distributor. Alternatively, the power subsystem can write the node power consumption data in a batch or incrementally (e.g., write the data as it is received from each component controller) to a memory location accessible by the distributor or a memory location that is part of the distributor. The flow continues at block 404.

At block 404, the distributor determines the node power cap for the node. The node power cap may be set in accordance with different techniques as mentioned with respect to FIG. 2. The flow continues at block 406.

At block 406, the distributor writes the node power consumption data and the node power cap to memory. The distributor can write the collection of component power consumptions to a segment of the memory reserved for the power consumptions, the background power consumption to another reserved segment of the memory, and the node power cap to a different reserved segment of the memory. The flow continues at block 408.

At block 408, the distributor notifies the component controllers that the component power consumptions for the given time period and the total power capacity have been written to memory. The notification can be in the form of an interrupt, alerting the component controllers that component power consumption for the given time period and the total power capacity have been written to memory. The notification includes a location in memory from which the component controllers can retrieve the component power consumptions for the first given time period and the node power cap. Some embodiments reserve x segments of memory to preserve the power consumption data across x time intervals. Power consumption data for a time interval would not be overwritten until the x segments are filled. Some embodiments write timestamps with the power consumption data. The flow continues at block 410.

The operations from block 410 and subsequent to block 410 represent operations of one of the component controllers. The component controllers asynchronously access the memory. At block 410, the component controller obtains the node power consumption data and the node power cap from the memory. The flow continues at block 412.

At block 412, the component controller calculates the node power consumption for the given time period. The component controller computes a sum of the component power consumptions and the background power consumption for the given time period. The flow continues at block 414.

At block 414, the component controller calculates a component power budget for component(s) associated with the component controller for a next time period. This calculation is performed based on the node power consumption for the given time period and the proportion of the node power consumption attributable to the component(s) associated with the component controller during the given time period. The flow continues at block 416.

At block 416, the calculated component power budget is used for the next time period for the associated components. For instance, the component controller activates an actuator to modify operation of the associated component(s) in accordance with the calculated power budget for the next time period. The controller itself may actuate the change in power consumption, or the controller may pass an indication of the calculated component power budget to another device that modifies operation of the associated component(s) accordingly.

The flowcharts are provided as examples and are not intended to limit scope of the claims. For example, embodiments can pass the power consumption data from a distributor to a memory location through an adder that generates a sum of the component power consumptions and background power consumption into a memory space defined for a node power consumption. Embodiment can write the individual power consumptions, or only communicate the node power consumption without granularity of the component power consumptions to the component controllers. In addition, embodiments can configure the component controllers to compute component power budgets based on proportional node power consumption without the background power consumption. For instance, the power cap may be defined for non-background power consumption.

Although the examples in this description depict only one distributor in a node, embodiments can employ one or more additional distributors. For example, another processor may be designated as a backup distributor for a failover scenario. As another example, components of a node may be logically divided into different groups of components and a different distributor be assigned responsibility for each logical grouping of components.

Although the examples in this description depict power budgeting based on past power consumption, embodiments can employ power budgeting in an oversubscription scenario. For example, a system having a plurality of power supplies may lose one or more of the power supplies. In such a scenario, the component controllers may receive an interrupt request ("IRQ"). Upon receiving the IRQ, the component controllers can immediately throttle their associated components, decreasing the power consumed by their associated components, and thus the node power consumption. After receiving, from the distributor, a node power cap reflective of the power supply failure, the component controllers can calculate new power budgets for their associated components based on the node power cap reflective of the power supply failure.

The examples above also describe a distributor supplying the collected power consumption data to the component controllers. In some embodiments, the distributor may transmit the node power consumption (i.e., total power consumption by the node) to the component controllers without the breakdown of power consumption across controllers. In other embodiments, a distributor transmits both the node power consumption and the collection of component power consumption to the component controllers.

Although the examples above describe proportional power budgeting of excess power in a pro-rata manner, embodiments can employ proportional budgeting that is not strictly pro-rata. For example, certain components may be allocated a predetermined percentage of the excess, or may be allocated a predetermined percentage in addition to their pro-rata share. In other embodiments, certain components may be allocated a predetermined power level, or may be allocated a predetermined power level in addition to their pro-rata share.

Figure 5:
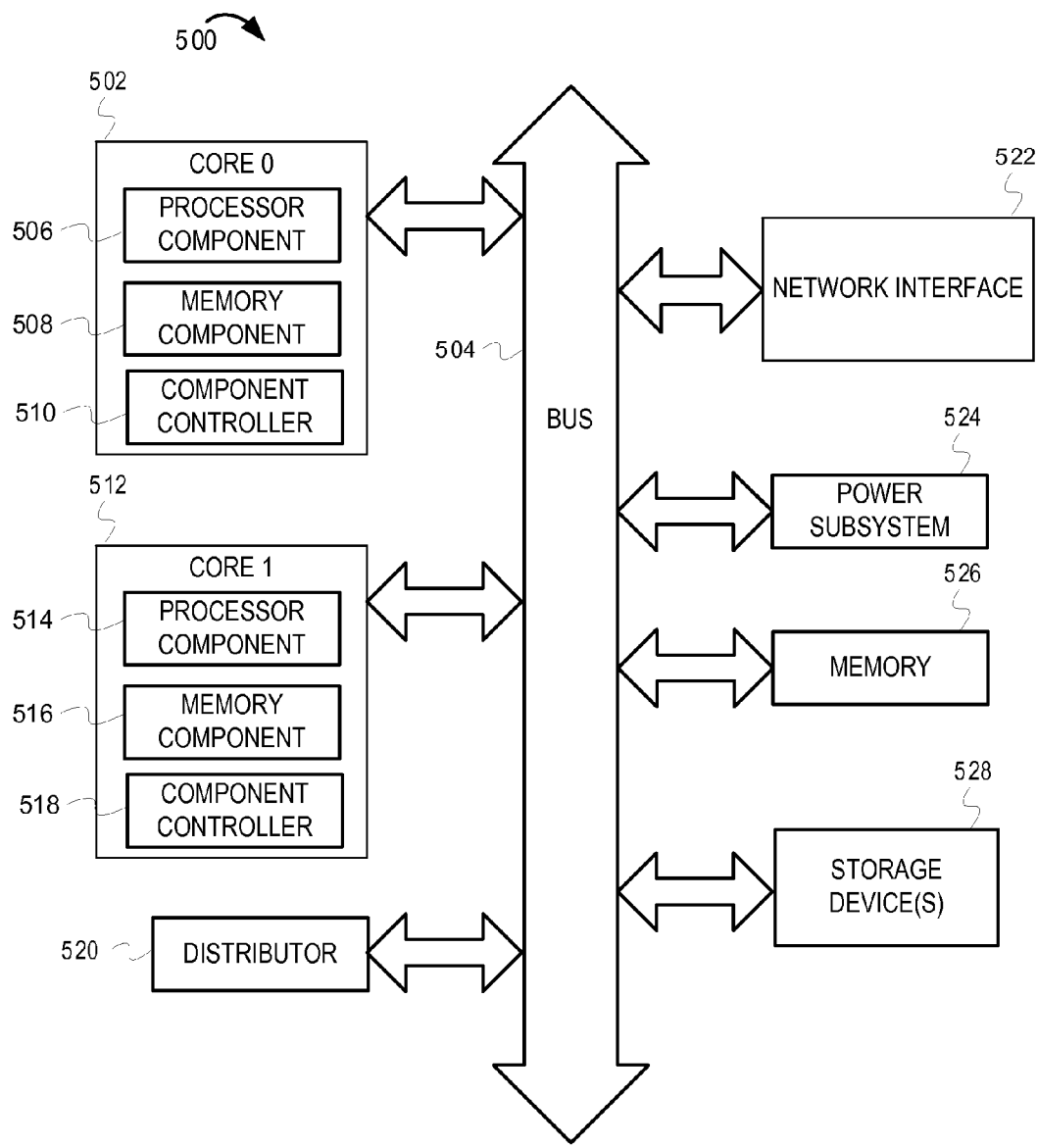
FIG. 5 depicts an example computer system 500.

FIG. 5 depicts an example computer system 500. The computer system 500 includes a processor having multiple cores 502 and 512 (possibly including other processors, additional cores, etc.). The computer system includes memory 526. The memory 526 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable storage media. The computer system also includes a bus 504, a network interface 522 (e.g., an ATM interface, an Ethernet interface, a Frame Relay interface, SONET interface, wireless interface, etc.), and a storage device(s) 528 (e.g., optical storage, magnetic storage, etc.). The computer system 500 includes multiple cores 502 and 512. Each core 502 and 512 has a processor component 506 and 514, a memory component 508 and 516, and a component controller 510 and 518, respectively. The computer system 500 also includes a distributor 520 and a power subsystem 524. The power subsystem 524 collects component power consumption data from the component controllers 510 and 518, as well as background power consumption data for the computer system 500. The power subsystem 524 communicates the component power consumptions and the background power to the distributor 520. In some embodiments, the distributor calculates node power consumption and distributes the node power consumption to the component controllers 510 and 518. The component controllers 510 and 518 then calculate and update the power budget for the components 506, 508, 514, and 516 with which they are associated. Further, realizations may include fewer or additional components not illustrated in FIG. 5 (e.g., video cards, audio cards, additional network interfaces, peripheral devices, etc.). The core 502 and 512, the storage device(s) 528, and the network interface 522 are coupled to the bus 504. Although illustrated as being coupled to the bus 504, the memory 526 may be coupled to the cores 502 and 512.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as JAVA (an object-oriented, class-based computer programming language), SMALLTALK (an object-oriented, dynamically typed computer programming language), C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for distributed component power budget computation based on proportional power consumption as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   collecting, from each of a plurality of controllers of a node having a plurality of components, component power consumption for a first time period, wherein each of the plurality of controllers is associated with a respective one of the plurality of components;
   providing, to each of the plurality of controllers, the component power consumptions for the first time period;
   for each of the plurality of components,
      determining a node power consumption for the first time period for the node based, at least in part, on the component power consumptions;
      determining a power differential for the first time period as a difference between the node power consumption and a power cap for the plurality of components;
      determining a proportion of the node power consumption consumed by the component during the first time period based on the component power consumption of the component; and
      computing, by a respective controller for the component, a local power budget for the component for consumption during a second time period based, at least in part, on the power differential and the proportion of the node power consumption consumed by the component during the first time period,
   wherein said computing the local power budget for the component based, at least in part, on the local proportion of the total power consumption comprises, in response to an overconsumption of power represented by the power differential, reducing the local power budget from a current local power budget based on the proportion of the node power consumption consumed by the component and the overconsumption of power represented by the power differential, and
   wherein said computing the local power budget for the component based, at least in part, on the local proportion of the total power consumption comprises, in response to an under-consumption of power represented by the power differential, increasing the local power budget from a current local power budget based on the local proportion and the under-consumption of power represented by the power differential.

2. The method of claim 1 further comprising determining the power cap for the plurality of components.

3. The method of claim 1, wherein said providing, to each of the plurality of controllers of the system, the component power consumptions comprises:
   storing the component power consumptions in a location; and
   providing an alert to the plurality of controllers, wherein the alert comprises an indication that the component power consumptions have been stored and an indication of the location at which the component power consumptions have been stored.

4. The method of claim 1, wherein said providing, to each of the plurality of controllers of the system, the component power consumptions comprises broadcasting, to the plurality of controllers, the component power consumptions.

5. The method of claim 1, wherein the plurality of components comprises processor components and memory components.

6. The method of claim 1, further comprising, for each of the plurality of components, controlling the component to operate in accordance with the local power budget.

* * * * *